(12) United States Patent
Dong

(10) Patent No.: US 6,944,738 B2
(45) Date of Patent: Sep. 13, 2005

(54) SCALABLE DESIGN FOR DDR SDRAM BUSES

(75) Inventor: Lam S. Dong, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 210 days.

(21) Appl. No.: 10/123,398

(22) Filed: Apr. 16, 2002

(65) Prior Publication Data

US 2003/0196032 A1 Oct. 16, 2003

(51) Int. Cl.[7] ................................................. G06F 12/00
(52) U.S. Cl. .................... 711/167; 711/105; 713/322
(58) Field of Search ................................. 711/322, 167, 711/105; 713/400, 401, 500–503, 600, 601; 365/233

(56) References Cited

U.S. PATENT DOCUMENTS

| | | | |
|---|---|---|---|
| 5,978,929 A  * | 11/1999 | Covino et al. .............. 713/503 |
| 6,073,223 A  * | 6/2000 | McAllister et al. .......... 711/167 |
| 6,445,234 B1 | 9/2002 | Yoon et al. .................. 327/161 |
| 6,496,445 B2 * | 12/2002 | Lee ............................. 365/233 |
| 6,570,815 B2 | 5/2003 | Kashiwazaki ............... 365/233 |
| 6,611,905 B1 * | 8/2003 | Grundon et al. ............ 711/167 |
| 6,615,326 B1 | 9/2003 | Lin ............................. 711/154 |
| 6,813,674 B1 * | 11/2004 | Velasco et al. ............. 710/311 |
| 2001/0014934 A1 * | 8/2001 | Toba ........................... 711/167 |
| 2002/0002662 A1 * | 1/2002 | Olarig et al. ................ 711/167 |
| 2002/0010875 A1 * | 1/2002 | Johnson et al. ................ 714/5 |
| 2003/0028727 A1 * | 2/2003 | Kochiya ...................... 711/114 |
| 2003/0061528 A1 * | 3/2003 | Blake et al. ................. 713/600 |

OTHER PUBLICATIONS

Stokes, Jon, "ARS Technica RAM Guide: Part III: DDR RAM and RAMBUS," http://arstechnica.com/paedia/r/ram_guide/ram_guide.part3–1.html, Jul. 2004.*

* cited by examiner

*Primary Examiner*—Matthew D. Anderson
*Assistant Examiner*—Shane Thomas
(74) *Attorney, Agent, or Firm*—Meyertons Hood Kivlin Kowert & Goetzel, P.C.; B. Noël Kivlin

(57) ABSTRACT

A memory subsystem and a method for use in accessing a memory system are disclosed. The memory subsystem comprising a plurality of SDRAM memory modules and a memory controller. The memory controller is capable of waiting to generate a memory clock signal for each of the SDRAM memory modules until a valid window for a control signal and an address signal; generating the memory clock signals during the valid window, and generating the control and address signals. The method comprises: waiting for a valid window for a control signal and an address signal; generating a memory clock during the valid window; and generating the control signal and the command signal a predetermined period of time after generating the memory clock signal.

4 Claims, 5 Drawing Sheets

SCALABLE DESIGN FOR DDR SDRAM BUSES

BACKGROUND OF THE INVENTION

1. Field of the Invention

The present invention pertains to buses for synchronous dynamic random access memory ("SDRAM") and, more particularly, to a double data rate ("DDR") SDRAM bus design that is scalable with frequency.

2. Description of the Related Art

One continually evolving computing system characteristic is "speed." In a vernacular sense, "speed" is simply a measure of a computing system's power, or ability to handle large amounts of data or execute sophisticated applications. In a more technical sense, speed is measured by the number of operations performed or instructions executed per second. Either way, faster speeds are typically considered more desirable because they imply increased performance in a computing system.

A computing system's speed is a function of many aspects of its design. The general public tends to focus on processor clock speed because of its significance in the performance of personal computers. Furthermore, processor clock speeds continually reach previously unattainable speeds on a regular basis, thereby fueling the public's interest. However, processor clock speed is but one factor in the speed of the computing system as a whole. Another important factor is the speed of the memory subsystem used by the processor. If the processor races far beyond the speeds attainable by the memory subsystem, the processor's excess speed results only in unrealized potential as opposed to actual performance.

Computer engineers and architects consequently devote as much effort to improving the performance of memory subsystems as they do processors. Memory subsystems frequently employ "memory modules" that typically includes multiple memory devices mounted to one or more printed circuit boards and configured into a single portion of the memory subsystem. Some memory modules are "dual in-line" memory modules ("DIMMs") and some are "single in-line" memory modules ("SIMMs"). The principal difference between DIMMs and SIMMs is that processors and controllers access SIMMs over a bus that is 32 bits wide, but access DIMMs over a bus that is 64 bits wide.

One memory technology common today is called Synchronous Dynamic Random Access Memory ("SDRAM"). SDRAM actually synchronizes its operation with the processor using the signals on the processor's bus. SDRAM implementations are generally capable of running at 133 MHz, which is relatively fast compared to other commonly used memory technologies. SDRAM has several features that improve performance relative to other dynamic random access memory ("DRAM") technologies. For instance, the memory devices are arranged in "banks" that alternate during an access so that some functions can be performed in parallel rather than in serial. SDRAM is also capable of "bursting" data, which permits greater data output rates.

Under pressure from the constant demand to improve performance, designers have developed an SDRAM known as double data rate synchronous dynamic random access memory ("DDR SDRAM"). DDR SDRAM is structured and functions similarly to regular SDRAM, but doubles the bandwidth of the memory by transferring data twice per cycle—on both the rising and falling edges of the clock signal. In conventional SDRAM, only one or the other of the falling and rising edges can trigger a data transfer, but, in DDR SDRAM, both are used. Thus, DDR SDRAM can essentially transfer twice as much data in a given period of time as can conventional SDRAM.

Even such an improvement as DDR SDRAM can have only limited impact on overall performance of a computing system, however. For instance, no matter how fast the processor(s) and memory subsystem are, the system as a whole can be no faster than the bus, or connection, between them. With SDRAM and DDR SDRAM, one performance limitation is the physical length of the bus, and especially the traces of the bus, between the processor(s) and the devices of the memory modules. Each unit length of the bus creates a "propagation delay." Longer buses have greater the propagation delays that slow their performance. High speed buses consequently need to be short. As the pressure for faster operation grows, the length of these buses decreases.

One of the many problems associated with this phenomenon is it hampers the applicability of the SDRAM technology. Because the buses must be short, SDRAM is relatively difficult to use in memory intensive computing systems, e.g., servers. Such systems employ large memory subsystems with many memory modules, which requires long buses that induce large propagation delays. To counteract this problem, computer architectures employ repeaters, and or buffer chips. These solutions raise additional complications, however, such as increased complexity and higher cost. In other words, the SDRAM technology is not very scalable to large memory subsystems because of the physical limitations of the traces and the bus.

SUMMARY OF THE INVENTION

The invention is a technique for accessing a memory subsystem employing synchronous memory modules. In a first aspect, the technique includes a memory subsystem comprising a plurality of synchronous memory modules and a memory controller. The memory controller is capable of waiting to generate a memory clock signal for each of the synchronous memory modules until a valid window for a control signal and an address signal, generating the memory clock signals during the valid window, and generating the control and address signals. In a second aspect, the technique includes a method for use in accessing a synchronous memory module. The method comprises: the method comprises waiting for a valid window for a control signal and a command signal; generating a memory clock during the valid window; and generating the control signal and the command signal a predetermined period of time after generating the memory clock signal. Still other aspects of the invention are set forth in the detailed description and in the claims below.

BRIEF DESCRIPTION OF THE DRAWINGS

The invention may be understood by reference to the following description taken in conjunction with the accompanying drawings, in which like reference numerals identify like elements, and in which.

Figure 1:
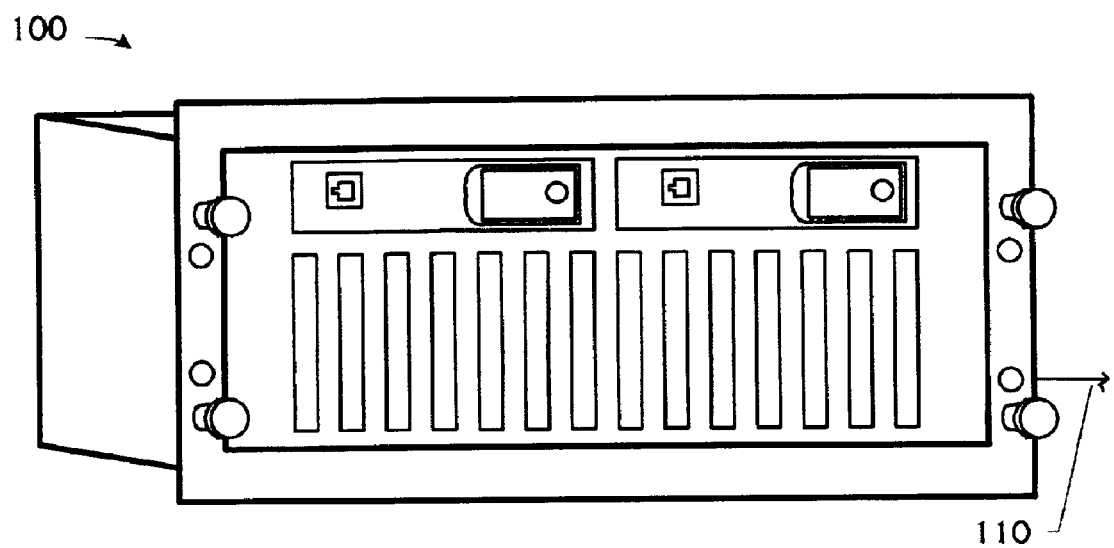
FIG. 1 depicts, in a plan view, an electronic computing device programmed and operated in accordance with one particular embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 1 depicts in a plan view a computing device 100 manufactured, programmed, and operated in accordance with the present invention. In the illustrated embodiment, the computing device 100 is a Sun Ray™ server employing a UNIX-based operating system (e.g., a Solaris™ OS) commercially available from the assignee of this application, Sun Microsystems, Inc. However, the invention is not so limited. The invention may be implemented in virtually any electronic computing device running virtually any type of operating system. Thus, the computing device 100 may be, in alternative embodiments, some other type of computer, such as a desktop personal computer, a notebook computer, a workstation, a mini-computer, or a mainframe computer. Similarly, the computing device 100 may employ a Windows™ or a disk operating system ("DOS")-based operating system. The invention is not limited by these aspects of any given implementation.

Figure 2:
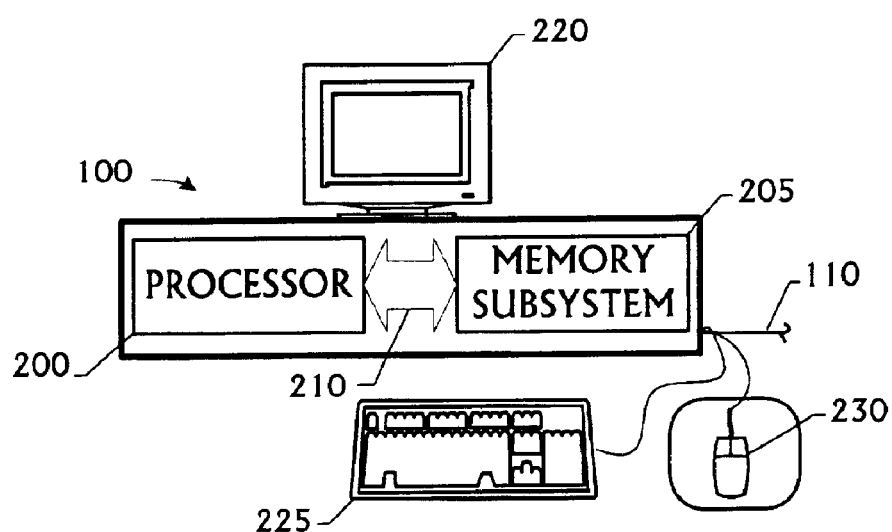
FIG. 2 conceptually illustrates in a partial block diagram selected portions of the hardware architecture of the electronic computing device of FIG. 1.

Selected portions of the hardware architecture of the computing device 100 relevant to the present invention are illustrated in FIG. 2. The computing device 100 includes at least one processor 200 interfaced with a memory subsystem 205 over a bus system 210 in a conventional fashion. For instance, the computing device 100 also includes a monitor 220, a keyboard 225, and a mouse 230, each of which the processor 200 interfaces with through an input/output ("I/O") controller that is not shown. As those in the art having the benefit of this disclosure will appreciate, FIG. 2 omits this and other routine features of the hardware architecture that will be readily supplied by knowledge common to those of ordinary skill in the art and are not pertinent to the present invention. The omission is for purposes of clarity, so as not to obscure the present invention.

The processor 200 may be any suitable processor known to the art. For instance, the processor may be a microprocessor or a digital signal processor ("DSP"). In the illustrated embodiment, the processor 200 is an UltraSPARC™ 64-bit processor available from Sun Microsystems, but the invention is not so limited. The microSPARC™ from Sun Microsystems, any of the Itanium™, Pentium™, or Alpha™-class processors from Intel Corporation, or the Athlon™ or Duron™ class processors from Advanced Micro Devices, Inc. might be employed. Still further, in some alternative embodiments, the processor 200 might be a controller, as opposed to a microprocessor or DSP. The invention is not limited by this aspect of any particular implementation.

Figure 3:
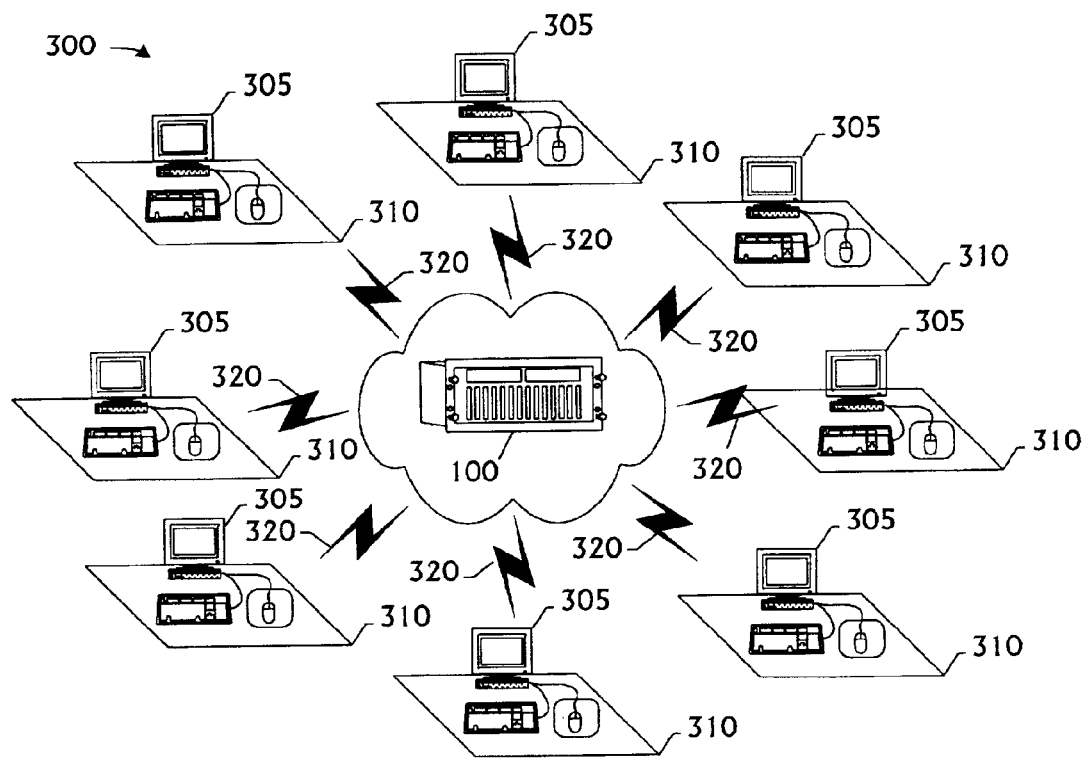
FIG. 3 conceptually illustrates the electronic computing device of FIG. 1 as a portion of a larger computing system in one particular embodiment.

The computing device 100 may comprise a portion of a larger computing system 300, shown in FIG. 3, by a connection over the line 110, shown in FIG. 1 and FIG. 2. The computing system 300 may be a local area network ("LAN"), a wide area network ("WAN"), a system area network ("SAN"), an intranet, or even a portion of the Internet. The computing system 300 implements a client/server architecture, with the computing device 100 providing the server function for the computing system 300. The clients 310 in the illustrated embodiment are workstations (e.g., the Sun Blade™ or the Ultra™ line of workstations) also employing a UNIX-based operating system (e.g., a Solaris™ OS).

However, the invention is not so limited. The clients 310 may be implemented in virtually any type of electronic computing device such as a notebook computer, a desktop computer, a mini-computer, a mainframe computer, or a supercomputer. The communications links 320 over which the server 100 and the clients 310 communicate may be twisted wire pairs, coaxial cable, optical fiber, or some other suitable transmission medium known to the art. In some embodiments, the communications links 320 may even be wireless. Similarly, the computing system 300 may employ a peer-to-peer architecture instead of a client/server architecture. The invention is not limited by these aspects of any given implementation.

Returning now to FIG. 2, the processor 200 interfaces with the memory subsystem 205 over the bus system 210 in a conventional fashion, as was mentioned above. The memory subsystem 205 includes SDRAM, as will be discussed further below. The interface between processors, such as the processor 200, and memory subsystems, such as the memory subsystem 205, are defined by well known protocols and standards commonly employed in the art. Thus, the design, manufacture, and operation of the bus system 210 and the interface between the processor 200 and the memory subsystem 205 will be apparent to those in the art having the benefit of this disclosure.

Figure 4:
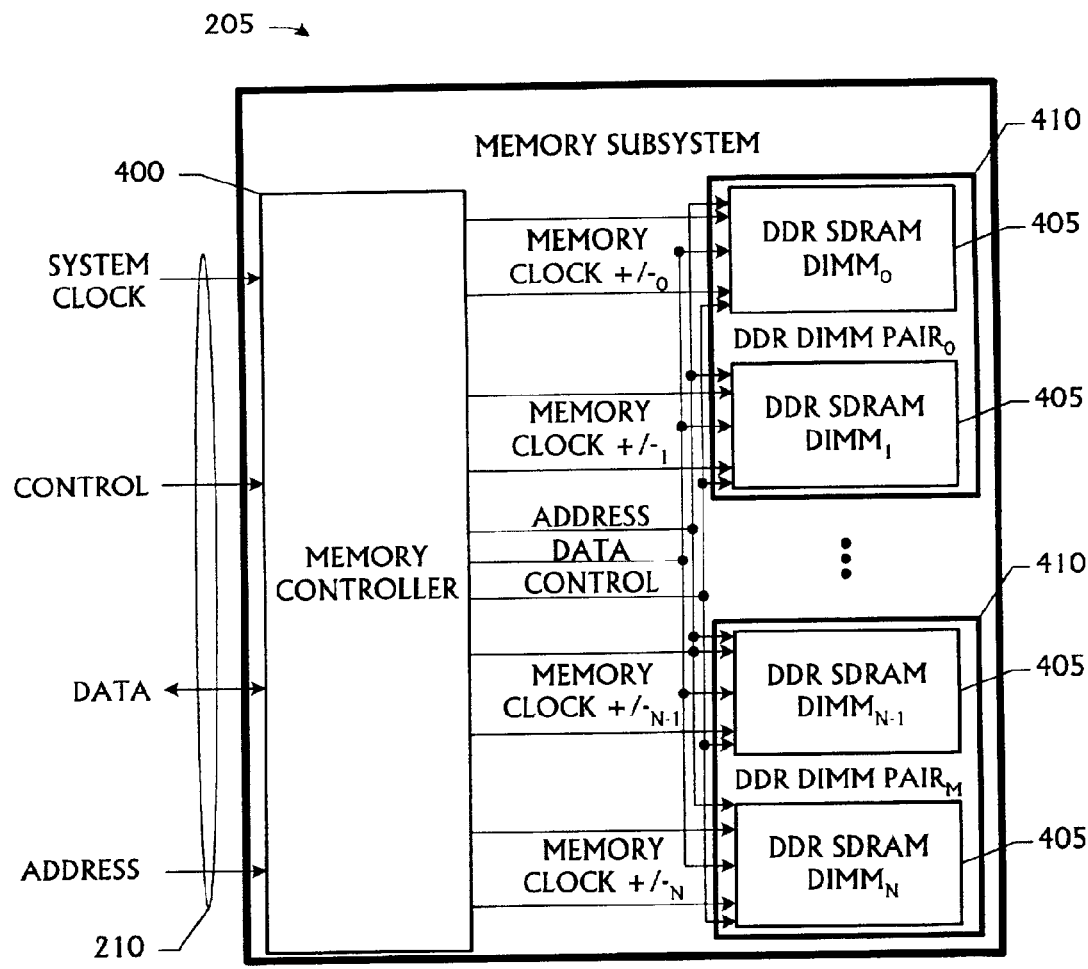
FIG. 4 depicts the memory subsystem of FIG. 1 in a block diagram.

The memory subsystem 205 includes, as is shown in FIG. 4, a memory controller 400. The memory controller 400 receives a system clock, control, data, and address signals from the processor 200 (shown in FIG. 2) over the bus system 210. The memory controller 400 latches the information in these signals so that the processor 200 can perform other tasks in accordance with its programming. The information defines an access by the processor 200 to the contents of the memory subsystem 205. The access may either read data from or write data to the memory subsystem 205. The memory controller 400 processes the access within a predetermined time such that, e.g., in the case of a read, the processor 200 will know when the data will be available and can interrupt its other tasks to receive the data. This functionality is implemented in accordance with conventional practice for SDRAM.

The memory subsystem 205 also includes, in the illustrated embodiment, a plurality of DDR SDRAM DIMMs 405, denominated DDR SDRAM DIMM$_0$–DDR SDRAM DIMM$_N$ in FIG. 4. The DDR SRAM DIMMs 405 are grouped into DDR DIMM pairs 410 denominated DDR DIMM PAIR$_0$–DDR DIMM PAIR$_M$ in FIG. 4. Note that the invention is not limited to DDR SDRAM, and may be applied to conventional SDRAMs, sometime also referred to as Joint Electron Device Engineering Council ("JEDEC") SDRAM. JEDEC is an industry standards setting organization that has promulgated standards associated with both conventional SDRAM and DDR SDRAM. Note also that the invention may be employed in SDRAM SIMMs even though SDRAM is seldom implemented in SIMMs.

Still referring to FIG. 4, the memory controller 400, mentioned above, receives from the processor 200 and latches system clock, control, address, and data signals. The memory controller 400 generates from the system clock a respective differential clock signal MEMORY CLOCK$_x$ for each of the DDR SDRAM DIMMs 405. The memory controller 400 also generates SDRAM control signals from the system control signals that are transmitted to DDR SDRAM DIMMs 405 to perform access. The system address and system data information are passed by the memory controller 400 through to the DDR SDRAM DIMMs 405. The timing of the differential clock, control, address, and data signals accords with the JEDEC DDR SDRAM DIMM standard.

Note, however, that other standards might be employed in alternative embodiments.

Figure 5:
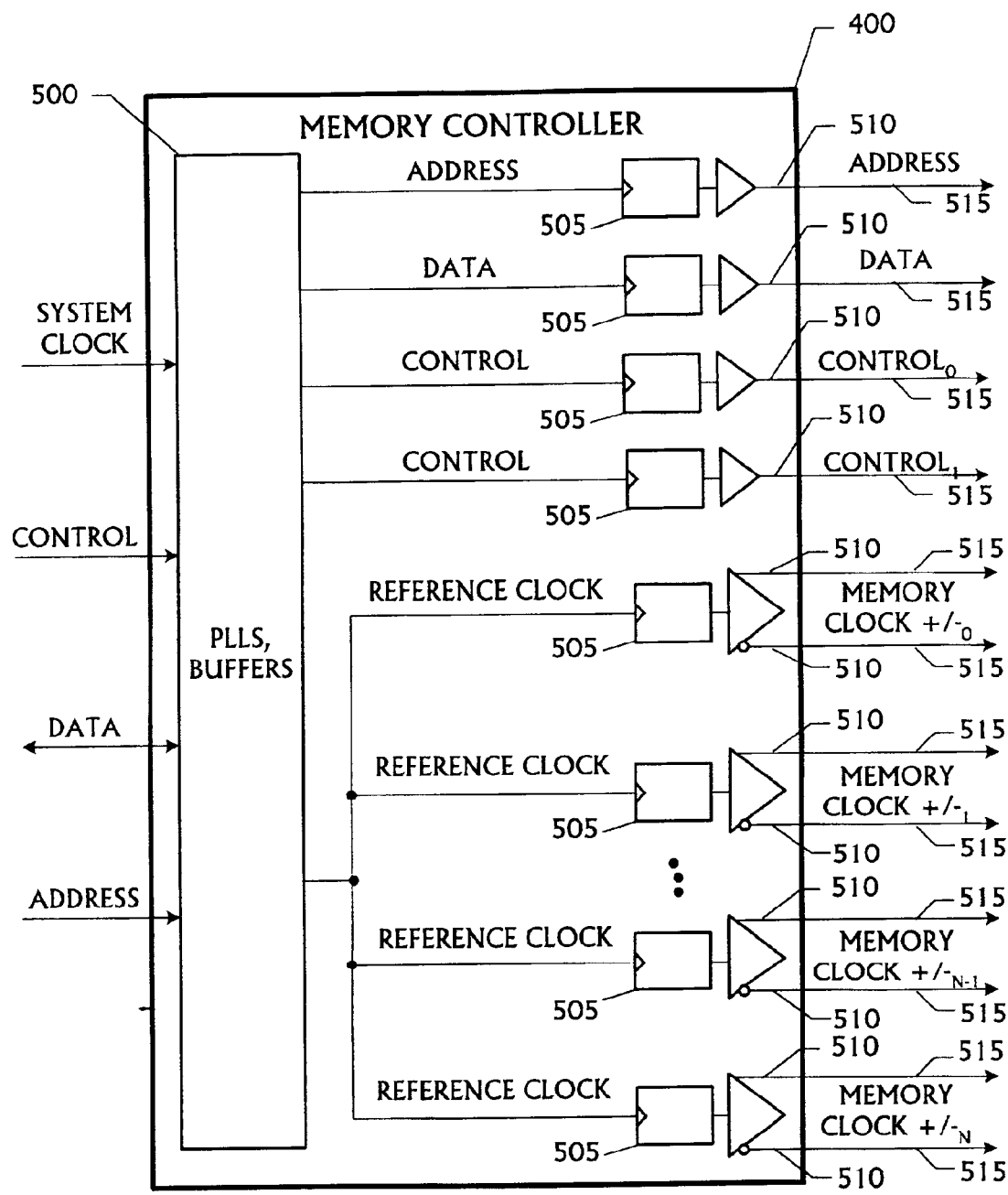
FIG. 5 illustrates the memory controller of FIG. 4 in a block diagram.

Selected portions of the internal structure of the memory controller 400 pertinent to the invention are illustrated in FIG. 5. The memory controller 400 receives data, address, and control signals from the processor 200 over the bus system 210, both shown in FIG. 2, buffers them in the phase-locked loops ("PLLs") and buffers 500, and then latches them with the latches 505. The PLLs and buffers 500 and the latches 505 are implemented in conventional fashion for SDRAM controller designs. These signals are then transmitted to the DDR SDRAM DIMMs 405. The signals are transmitted on package traces 510 internal to the memory controller 400 and external traces 515 on a printed circuit board not otherwise shown. The memory controller 400 and, perhaps, one or more of the DDR SDRAM DIMMs 405 are mounted to the PCB on which the external traces 515 are formed. Note that the control signals of FIG. 4 are actually implemented in two signals CONTROL$_0$ and CONTROL$_1$ in the illustrated embodiment, one for each half of the DDR SDRAM DIMMs 405.

In accordance with the present invention, the memory controller 400 generates from the system clock respective differential clock signals MEMORY CLOCK$_0$–MEMORY CLOCK$_N$ from the system clock in the middle of the valid windows for the address and control signals transmitted from the memory controller 400 to the DDR SDRAM DIMMs 405. As will be appreciated by those skilled in the art having the benefit of this disclosure, the valid windows are dictated by the setup and hold times of the individual DDR SDRAM DIMMS 405. In accordance with conventional practice, the valid windows are defined relative to the falling edge of the system clock received by the memory controller 400 from the host processor 200 (shown in FIG. 2). However, the timing of the valid windows will be known, with some margin or error, for any given implementation as a feature of the implementation's design.

For instance, in the illustrated embodiment, the DDR SDRAM DIMMs 405 are implemented to comply with the JDEC DDR SDRAM DIMM standard. This standard defines a time period in which the address and control signals must contain valid information for the DDR SDRAM DIMMs 405 relative to the falling edge of the system clock received by the memory controller 400. Thus, the memory subsystem 205 (shown in FIG. 2) is designed so that data and control information received by the memory controller 400 over the bus system 210 is valid to the DDR SDRAM DIMMs 405 during the time period specified in this standard. The valid windows for the command and address information are therefore known to the designer. Note, however, that alternative embodiments may employ alternative standards, and so the valid windows will vary depending on the embodiment.

Figure 6:
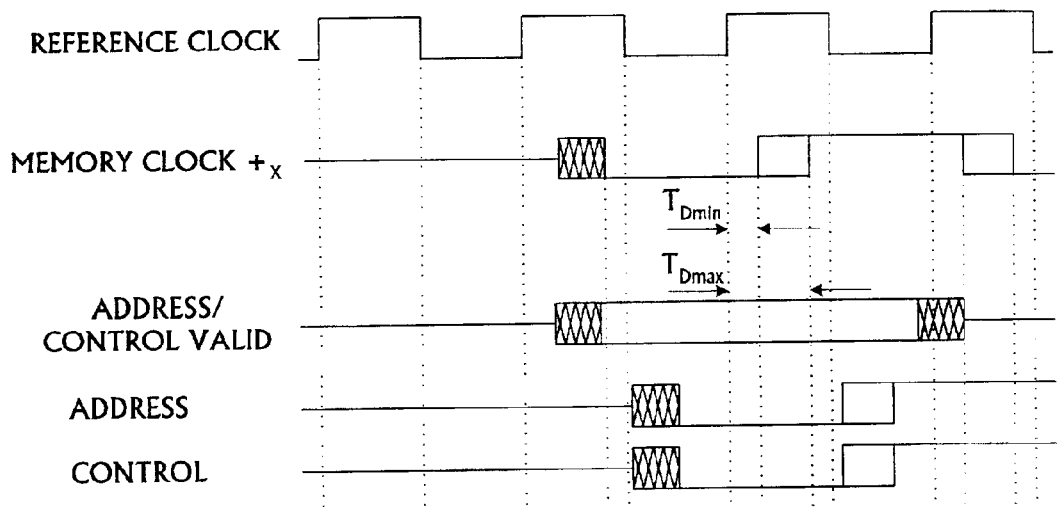
FIG. 6 depicts the timing of signals employed in the memory subsystem of FIG. 4 in a block diagram.

Returning to FIG. 5, the PLLs and buffers 500 of the memory controller 400 consequently generate a "reference clock" used to determine when the valid windows open. In the illustrated embodiments, the references clock operates at twice the frequency of the memory clocks. As mentioned above, the memory clocks MEMORY CLOCK$_1$–MEMORY CLOCK$_N$ are then generated during the valid windows. FIG. 6 is a timing diagram illustrating the timing for this process. Note that the memory clock MEMORY CLOCK$_X$ is indeterminate until the valid window opens. FIG. 6 also illustrates the effect of timing uncertainties, represented by T$_{Dmin}$ and T$_{Dmax}$, arising from various implementation specific features. The components of this uncertainty include the:

timing skew among reference clock signals used to the generate differential memory clock signals MEMORY CLOCK$_1$–MEMORY CLOCK$_X$;

delay from the latches 505 to the differential memory clock outputs of the memory controller 400;

delay from the memory controller 400 to the DDR DIMM pairs 410 due to PCB trace length;

delay from the DIMM socket pins (not shown) to the clock inputs of the SDRAMs (not shown) of the DDR SDRAM DIMMs 405 (e.g., the delay specified in the JDEC DDR SDRAM DIMM standard);

DIMM PLL static phase error;

DIMM PLL jitter;

DIMM PLL output skew; and clock net skew between all SDRAM clock inputs and register inputs (not shown) on the DDR SDRAM DIMMs 405 arising from less the ideal matching of trace length in the DIMM clock network.

Note, however, these are exemplary only and other implementations may encounter other sources of delay in addition to or in lieu of those set forth above.

In the illustrated embodiment, the timing of all memory interface signals (e.g., address, data, and control signals), not just the memory clocks, is relative to this reference clock. The address and control signals from the memory controller 400 to the DDR SDRAM DIMMs 405 are generated by the memory controller 400 one reference clock cycle after the differential memory clocks MEMORY CLOCK$_1$–MEMORY CLOCK$_N$ are generated. This timing is also shown in FIG. 6. Since the differential memory clocks are generated relative to the reference clock, so, too, are the control and address signals.

In operation, the processor 200, shown in FIG. 2, accesses the memory subsystem 205 over the bus system 210. The processor 200 then leaves the memory subsystem 205 to perform the access and performs others tasks in accordance with its programming. If the access is a read, the processor 200 returns at a predetermined time to receive the read data from the memory subsystem 205 over the bus system 210.

The memory controller 400 of the memory subsystem 205, shown in FIG. 4, receives the data, control, and address information from processor 200 and latches it. The memory controller 400 also receives the system clock over the bus system 210, from which it derives the reference clock.

Figure 7:
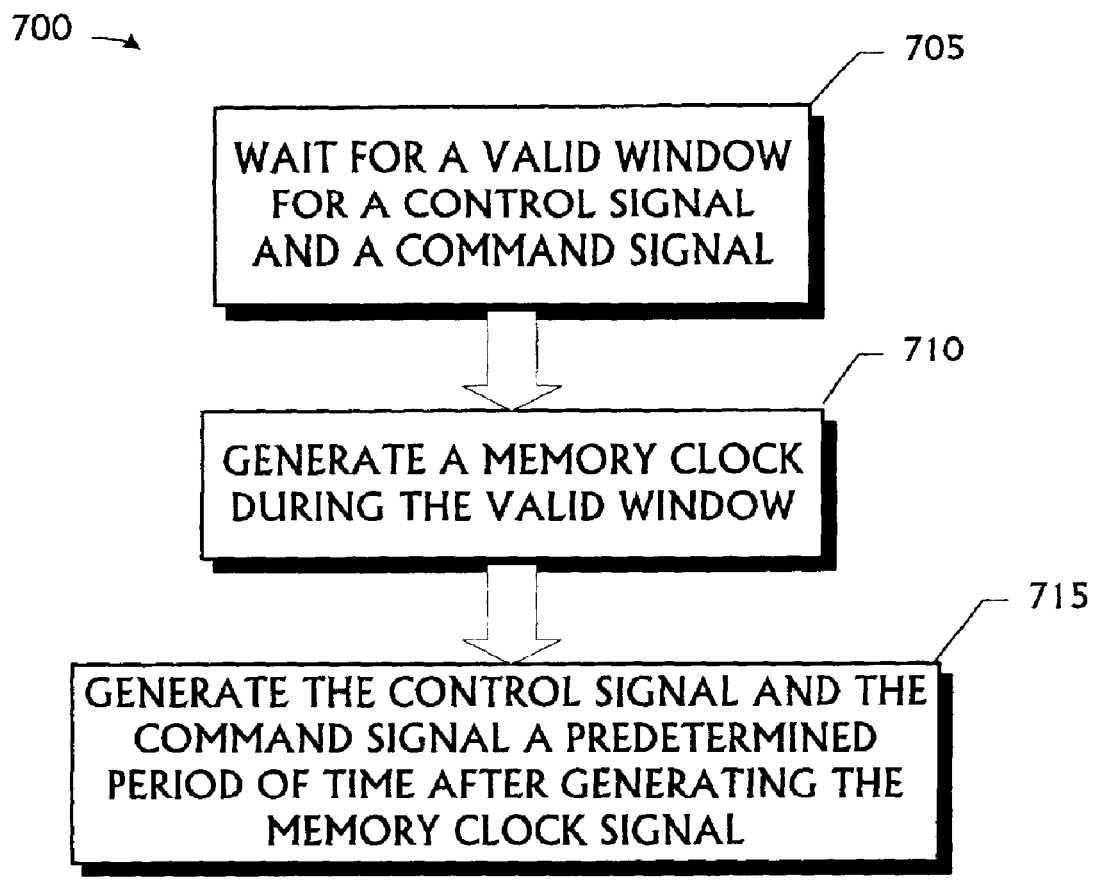
FIG. 7 illustrates one particular embodiment of a method for use in accessing an SDRAM memory module in accordance with the present invention.

The memory controller 400 then generates timing signals in accordance with the present invention. One embodiment of a method 700 for doing so is illustrated in FIG. 7. The memory controller 400 waits for the valid window for the address signal and the command signal, as is set forth in box 705. The memory controller 400 then generates a memory clock during the valid window, as set forth in box 710. More particularly, the memory controller generates one memory clock for each of the DDR SDRAM DIMMs 405.

Then, the memory controller generates the control signal and the command signal a predetermined period of time after generating the memory clock signal, as set forth in box 715. The remainder of the access is then performed in accordance with conventional practice, using the timing signals generated in accordance with the present invention.

Note that the present invention can guarantee that the rising edge of the memory clock signal arrives at the memory device in the center of the address and control valid windows at the memory devices. Maximizing hold and setup times then permits scaling the whole memory subsystem independently of the physical length of the buses, which conventional DDR SDRAM memory subsystems cannot do. Thus, in its various aspects, the present invention is a scalable design for SDRAM buses in which the reference clock for the SDRAM memory clock, control, and address signals is generated during the valid windows for the address/control information to the DDR SDRAM. The various aspects of the invention include:

A memory subsystem, comprising a plurality of SDRAM memory modules and a memory controller. The memory controller is capable of waiting to generate a memory clock signal for each of the SDRAM memory modules until a valid window for a control signal and an address signal, generating the memory clock signals during the valid window, and generating the control and address signals.

A memory subsystem comprising a plurality of SDRAM memory modules and a memory controller. The memory controller is capable of generating a reference clock during a valid window for an address or command signal to which address, control, and memory clock signals between the SDRAM memory modules and the memory controller are referenced.

A method for use in accessing a SDRAM memory module, comprising: the method comprises waiting for a valid window for a control signal and a command signal; generating a memory clock during the valid window; and generating the control signal and the command signal a predetermined period of time after generating the memory clock signal.

A method for use in accessing a plurality of SDRAM memory modules, comprising: receiving an access request and a system clock from a processor, the access request including at least two of address, data, and control information; generating a reference clock from the system clock; waiting a predetermined period of time measured by the reference clock for a valid window to open for a control signal and an address signal; generating a plurality of memory clocks, one for each of the SDRAM memory modules, from the reference clock; transmitting the generated memory clocks to the respective SDRAM memory modules; generating the control signal and the address signal in the valid window after generating the memory clocks; and transmitting the control signal and the address signal to the SDRAM memory modules.

Thus, in the various aspects of the invention, memory subsystems constructed and operated in accordance with the present invention are scalable with frequency, provide better timing margin through a wider range of frequencies, and may employ traces longer than may be found in conventional SDRAM memory subsystems.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A memory subsystem, comprising:
   a plurality of synchronous memory modules; and
   a memory controller capable of waiting to generate a memory clock signal for each of the synchronous memory modules until a valid window for a control signal and an address signal to the synchronous memory modules, generating the memory clock signals during the valid window and generating the control and address signals;
   wherein the memory controller is further capable of generating the address signal and the control signal in the valid window one half cycle of the memory clock after generating the memory clock signal.

2. A method for use in accessing a synchronous memory module, the method comprising:
   waiting for a valid window for a control signal and a command signal to the synchronous memory module;
   generating a memory clock signal during the valid window; and
   generating the control signal and the command signal a predetermined period of time after generating the memory clock signal;
   wherein generating the control signal and the command signal a predetermined period of time after generating the memory clock signal includes generating the control signal and the command signal one-half memory clock cycle after generating the memory clock signal.

3. A method for use in accessing a memory subsystem including a synchronous memory module, the method comprising:
   waiting for a valid window for a control signal an a command signal to the synchronous memory module;
   generating a memory clock signal during the valid window; and
   generating the control signal and the command signal a predetermined period of time after generating the memory clock signal;
   wherein generating the control signal and the command signal a predetermined period of time after generating the memory clock signal includes generating the control signal and the command signal one-half memory clock cycle after generating the memory clock signal.

4. A method for use in accessing a plurality of synchronous memory modules, the method comprising:
receiving an access request and a system clock from a processor, the access request including at least two of address, data, and control information;
generating a reference clock from the system clock;
waiting a predetermined period of time measured by the reference clock for a valid window to open for a control signal and an address signal to the synchronous memory module;
generating a plurality of memory clocks signals, one for each of the synchronous memory modules, from the reference clock;
transmitting the generated memory clocks signals to the respective synchronous memory modules;
generating the control signal and the address signal in the valid window after generating the clocks signals; and
transmitting the control signal and the address signal to the synchronous memory modules;
wherein generating the control signal and the command signal a predetermined period of time after generating the memory clock signals includes generating the control signal and the command signal one-half memory clock cycle after generating the memory clock signals.

* * * * *